United States Patent [19]
Leonard et al.

[11] Patent Number: 4,778,604
[45] Date of Patent: Oct. 18, 1988

[54] METHOD FOR RECLAIMING WASTE INK

[75] Inventors: Henry F. Leonard, Anaheim; Daniel L. King, Huntington Beach, both of Calif.

[73] Assignee: Separation Technologies, Inc., Placentia, Calif.

[21] Appl. No.: 65,761

[22] Filed: Jun. 24, 1987

[51] Int. Cl.$^4$ ................ B01D 17/00; B01D 45/00
[52] U.S. Cl. .................................. 210/664; 210/774; 210/788; 210/801
[58] Field of Search ............ 210/767, 800, 801, 787, 210/788, 774, 766, 664, 802, 806, 808; 203/39, 47, 99

[56] References Cited
U.S. PATENT DOCUMENTS 3,929,586 12/1975 Slikkers .............................. 210/751
4,437,940 3/1984 Sussmeyer et al. ................ 203/49

Primary Examiner—Frank Sever
Attorney, Agent, or Firm—Price, Gess & Ubell

[57] ABSTRACT

An improved method for reclaiming waste printing ink is provided that requires no dilution nor blending with virgin ink wherein substantially all entrained water and solvent contamination is removed in a vacuum distillation step. Solid impurities are removed via a subsequent filtration method that leaves the ink's pigment content substantially undiminished.

13 Claims, 2 Drawing Sheets

METHOD FOR RECLAIMING WASTE INK

BACKGROUND OF THE INVENTION

This invention relates to the reclamation of waste ink by removal of entrained water, solvents and solid impurities so as to render the ink reusable.

While there are a number of different printing processes that use different types of ink, the ink used in offset printing is especially difficult to reclaim due to the inherent nature of its composition and the nature of its typical contamination. Offset printing is a process in which an inked impression from a plate is first made on a rubber-blanketed cylinder and then transferred to the paper being printed. More specifically, the plate clamped onto a rotating plate cylinder comes in contact first with a dampening roller, then an inking roller and finally, the blanket cylinder. The dampening roller wets the plate with water or fountain solution so that the non-printing areas will repel ink. Ink picked up from the inking roller is transferred to the rubber blanket on the blanket cylinder. Paper is printed as it passes between the blanket and impression cylinders. Excess ink not transferred in the printing process is collected as waste, is substantially contaminated and, hence, is not reusable as is. The waste ink typically contains a very large amount of water, some solvents and a significant amount of paper dust and lint.

The motivation for reclaiming this waste ink is twofold. Virgin ink is expensive and the amount of waste ink produced in a typical offset printing operation is significant. Furthermore, as waste ink is toxic and considered hazardous waste, disposal thereof is becoming an increasingly difficult and expensive undertaking. Hence, a cost-effective reclamation of waste ink is both economically advantageous and environmentally desirable.

Numerous reclamation systems have been conceived. SSome have been implemented, but none have proven very successful. The nature of the ink, in combination with its typical contamination, makes for a very difficult material to purify. Ink used in the offset printing process has a very high pigment content which necessarily implies a correspondingly low oil content and therefore high viscosity. Paper dust and lint picked up during the printing process absorbs some of the oil and thereby renders the ink even more viscous. Entrainment of water has the effect of further thickening the ink. What results is a very stiff and viscous intimate admixture of mineral oil, pigment, water, paper dust and lint, and solvents. Ideally, the ink should be separated out with no significant reduction in its pigment content and with the rheological properties of virgin ink.

A much tried method of separation is one that employs the use of a series of strainers and filters. The high viscosity of waste ink hampers such a process and therefore requires dilution with virgin ink, an expensive and somewhat counterproductive step. The high content of very fine paper particulate rapidly clogs any fine mesh strainers or depth cartridges and therefore requires frequent cleaning and/or replacement cycles. Furthermore, a layer of paper particulate on a strainer or filter cartridge not only substantially increases back pressure, but in effect serves as an even finer mesh filter that is capable of actually restraining the ink pigment. Such an effect is herein referred to as "pre-filtration." Increasing the system's pressure will only aggravate this problem. Neither strainers nor filters can remove any entrained water from the waste ink and therefore, the end result of such a method is an inferior ink with a high water content that must be blended with a considerable amount of virgin ink to make reuse thereof feasible. Any replaceable filter elements must, of course, be properly disposed of.

Another approach entails the use of a centrifugal method. Once again, the nature of this process requires that dilution or blending with virgin ink be undertaken, both before and after the centrifugal separation. Further disadvantages of this process focus on the centrifuge itself, i.e., the extremely high cost of the equipment, the degree of skill required to operate it properly and the labor intensive manipulation thereof. In order to effectively take advantage of the specific gravity difference between the waste ink components and contaminants, an acceleration of many thousands of times the force of gravity is required. This calls for rather sophisticated high-speed equipment and close attention to its operation. At such high g-loads, even slight imbalances must be avoided, the viscosity of the waste ink must be constantly monitored and adjusted to ensure a smooth introduction into the device, and ink contamination levels must continually be measured so that proper throughput rates can be estimated and the equipment fine-tuned accordingly. Contamination levels of the reclaimed product must again be measured after centrifuging to determine whether a proper separation was accomplished. At typical particulate levels, frequent shutdown is required to disassemble the centrifuge to facilitate clean-out of the centrifuge bowl which entails a labor-intensive and messy procedure. An intrinsic disadvantage of the centrifugal method is that a portion of the ink pigment is separated out and, hence, lost. This is due to the fact that specific gravity of the pigment is higher than that of the oil base. The end product is an ink with a significantly reduced pigment content that must be blended with substantial amounts of virgin ink to be usable in the offset process.

The described disadvantages of the prior art are overcome by the present invention.

SUMMARY OF THE INVENTION

Accordingly, it is the object of this invention to provide a method of reclaiming waste offset printing ink by removing substantially all entrained water, solvents and solid impurities without a reduction in pigment content, without the need to blend with virgin ink, and with a minimum of operator intervention.

The present invention overcomes the deficiencies of the prior art and achieves its objectives by first subjecting the waste ink to a vacuum distillation procedure whereby substantially all the entrained water and solvents are boiled off under vacuum at a temperature well below that at which the ink is subject to chemical decomposition. Removal of substantially all the entrained water is paramount towards producing ink with the rheological properties required for the offset printing process. The resulting significant reduction of the viscosity also aids in subsequent handling and processing. Once contaminating liquids have been removed via the vacuum distillation procedure, the solid impurities are filtered out in such a manner so as not to diminish the content of the much finer pigment particles. This is accomplished by the use of a continually self-clearing filtering device which prevents a build-up of a layer of filtered particulate on the filter element thereby precluding any "pre-filtering" of pigment particles. Ink passing through the filter will be devoid of paper dust and lint and will have the pigment content and rheological properties necessary for use in the offset printing process.

It is thus a feature of this invention that the waste ink need not be blended with virgin ink to aid in its processing and that the resulting reclaimed ink need not be blended with virgin ink so as to render it usable in an offset printing process.

It is another feature of the present invention that a minimum of operator intervention is required as the simplicity of the process and the self-cleaning nature of the filtering device easily lends itself to automation.

BRIEF DESCRIPTION OF THE DRAWINGS

These and other features of the present invention will be readily appreciated as the same becomes better understood by reference to the following detailed description when considered in conjunction with the accompanying drawings, wherein.

DETAILED DESCRIPTION

Figure 1:
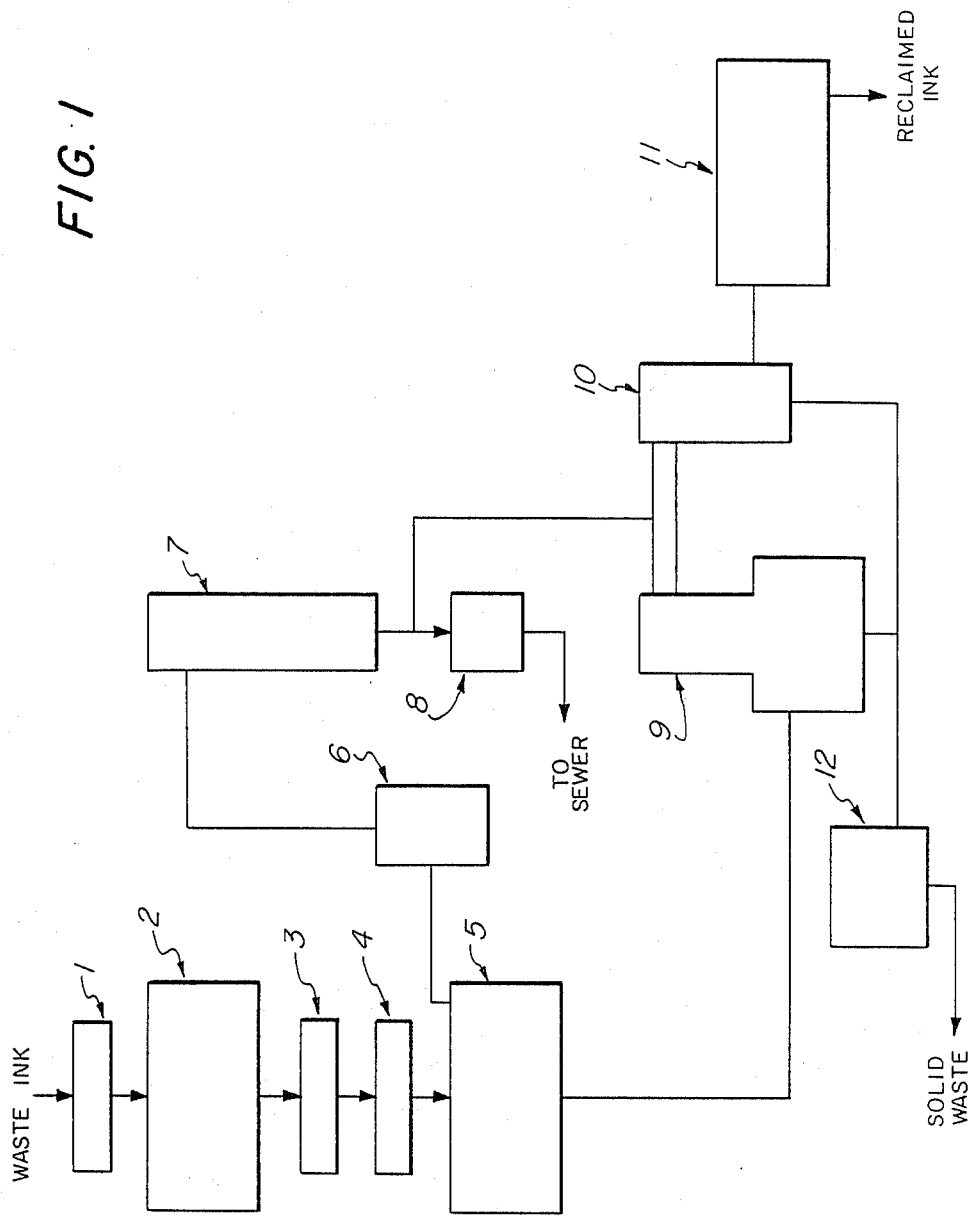
FIG. 1 is a schematic representation of the sequence of steps of the preferred embodiment of this invention.

The offset printing process requires an ink with approximately a 14% pigment content and a viscosity of 3,000–4,500 S.S.U. (Saybolt Second Units). Typically, the ink comprises carbon black particles in the 1.0–10 $\mu$m size range suspended in a mineral oil base. As it is the nature of the offset process that the plate cylinder comes in contact with the dampening roller with every revolution, a considerable amount of water or fountain solution contacts the ink in which a significant portion of it is absorbed. Ink not transferred to the paper is considered excess, is removed from the process via solvents and is ultimately collected with all the other ink which issues from the presses. Copious amounts of ink are thrown, dripped and leaked and all ultimately collects in the sumps. The nature of the process also generates a substantial amount of paper dust and lint and this, too, ends up co-mingling with the excess ink. Depending upon the operation, approximately 10–15% of the ink consumed is removed as waste. In an even moderately sized printing operation, this can amount to hundreds of thousands of pounds of waste ink per year.

The collected waste ink typically contains 15–20% water, approximately 3% solvents, up to 2% paper dust and lint and has a viscosity of 8,000–10,000 S.S.U., about the consistency of molasses. Substantially all these contaminants must be removed to render the waste ink reusable.

A prescreening of the waste ink prior to treatment according to the present invention has been found to be essential to prevent such gross contaminants as rags, large chunks of paper and insundry metal parts from clogging or damaging any of the components of the process. After prescreening, the waste ink is pumped into a prep tank in which substantially all liquid contamination is to be removed.

Simply raising the temperature above that at which water boils is unsatisfactory as the ink is subject to chemical decomposition. Some degradation is apparent at just above 180° F. while at a temperature of 225°–240° F., cross polymerization occurs which irreversibly transforms the ink into a solid. At even higher temperatures, cracking of the hydrocarbons occurs. It is thus essential that processing temperatures be kept to a minimum. A maximum temperature of 200° F. has been found to be the optimal limit. In order to boil off water with such a constraint, the pressure within the prep tank must be reduced. Once the waste ink has been introduced into the prep tank, the temperature of the waste ink is raised to 180° F. at which point a vacuum of 23" to 25" Hg is induced. This serves to boil off substantially all liquid contamination within the waste ink. The evaporated fraction is condensed and allowed to settle out; the imicible solvent component will float on top of the water. The water is drawn off, clarified and disposed of to the sewer while the solvent component is retained for later use.

After the vacuum distillation procedure, the waste ink is essentially free of any liquid contamination, only the solid impurities, i.e, the paper dust and lint, remain. The removal of water lowers the viscosity which is further reduced by the elevated temperature maintained throughout the rest of the process.

As it is essential that a "pre-filteration" effect be avoided so as to prevent the filtration of the smaller carbon black pigment, a filtering device is employed that prevents the build-up of particulate on the filter element. Pre-filtration is the phenomenon whereby a layer of filtered-out particles on a filter element effectively forms a very fine mesh filter which traps the smaller particulate that would normally pass through the filter element. It has been found that a continuously self-clearing metal plate-type filter avoids such an effect. A filter of this design will trap all particles larger than the given filter size and will pass all particulate of smaller dimensions. This particular type of filtering device consists of a stack of very precisely spaced circular plates or discs, the space between them being continuously combed by a stack of intermeshing cleaner blades. The continuous combing action is achieved by rotation of the stack of plates through the stationary intermeshing stack of cleaner blades at a rate commensurate with the rate of filtration. In order for fluid to pass through the filter, it must pass from outside of the stack of plates into its hollow interior via the space between the plates from where it can then freely exit the filter. Any particulate larger than the space between the plates will be detained and combed free to fall off the filter. The configuration of the filtering device is such that the particulate, thusly ejected from the stack of plates, drops into the center of the filter's sump situated directly below the plates. The center of the filter's sump is kept devoid of fluid by inducement of a vortex flow of fluid about the center of the sump. The reduced pressure at the center of the vortex serves to attract the falling particulate and hold it captive.

It has been found that the efficiency of this filtering device is greatly enhanced when the larger particles of solid impurities are caused to be "dislodged" from the flow of waste ink prior to contact with the filter plates. This is accomplished by directing the incoming high-pressure flow to impact a stationary surface within the filtering device. The abrupt change in flow direction causes the larger and heavier particles to become dislodged from the flow in the sense that their resulting velocity is considerably less than the velocity of the bulk of the ink flow. Their lower velocity makes them more susceptible to becoming adhered to any surfaces they subsequently contact within the device and to more easily become attracted towards, and held captive within, the low-pressure vortex area.

It has been found that a plate spacing of about 90 $\mu$um traps the vast majority of paper dust and lint and still allows for a reaonable throughput rate. The remaining contamination of particulate larger than about 40 $\mu$m, is so minimal that it can be removed by a standard fine mesh strainer with no danger of any substantial build-up of particulate on the filter capable of pre-filtering the carbon black pigment. The amount of particulate smaller than 40 $\mu$m present in the waste ink is negligible. The reclaimed ink issuing from this final filtration step has an undiminished pigment content and rheological properties sufficiently similar to virgin ink so that no further treatment or blending is necessary prior to reuse in an offset printing operation.

It is another feature of this invention that the solvents separated out from the ink do not go to waste. Periodically, both the plate filter sump and the final polishing strainer will need to be purged of accumulated particulate. An appropriate selection of respective filter capacities will cause the purging necessity to occur simultaneously. The solvent that was separated in the vacuum distillation step and subsequently decanted from the water is the ideal purge medium. When an increase in back pressure across the filters indicates an accumulation of particulate, the two filters are isolated, flushed with solvent and blown clean with compressed air. A high-pressure press recovers the solvent from the solids. The solids can then be disposed of as normal non-toxic, non-hazardous solid waste without any special handling requirements while the solvent is returned to the solvent tank where it can be used for subsequent purge cycles. The amount of recovered solvent that exceeds that quantity needed for the purging operations is returned to the offset printer where it can once again be used in the operation.

Referring to FIG. 1, waste ink is dumped into a 110 or larger gallon waste tank 2 through a refuse screen 1 which would trap particles larger than $\frac{1}{4}$". The ink is subsequently pumped to the 110 or larger gallon prep tank 5 which has provisions for heating, evacuation, and mixing. Strainers of 5/16" (3) and 9/64" (4) prevent any gross contaminants from entering the prep tank and possibly clogging or damaging any equipment. Once the transfer is complete, the temperature is raised to 180° F. at which point the tank is pumped down to a vacuum of 25" Hg. The contents are continuously agitated throughout the vacuum distillation procedure. Gases drawn off the top of the prep tank are condensed 6 and transferred to a solvent storage tank 7. When sufficient separation of components within the solvent tank has occurred, the water is drawn off, passed through a clarifier and discharged into the sewer. The remaining solvent in the solvent tank is retained for later use.

Figure 2:
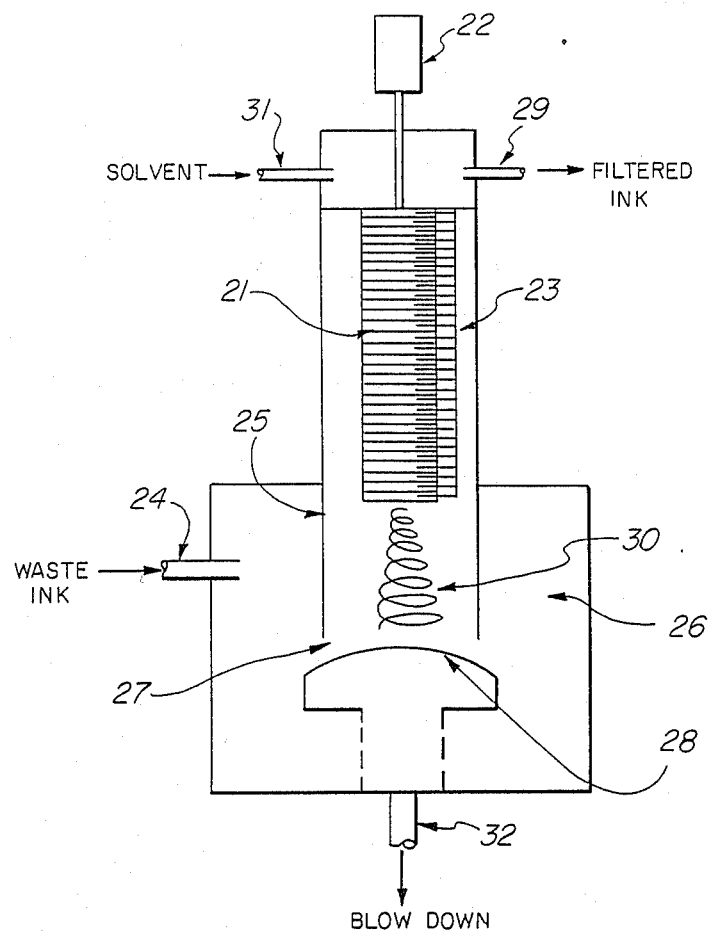
FIG. 2 is a longitudinal cross-section of the filtering device employed in the ink reclamation process of this invention.

After vacuum distillation, the waste ink is pumped through the filtering device portrayed in FIG. 2. Waste ink enters through inlet 24 under high pressure and immediately impacts the wall of the pick up tube 25. The deflected flow scatters throughout the interior of the filter sump 26 giving ample opportunity for the dislodged larger and heavier particles to adhere to the surfaces within the sump. The small gap 27 between the pick-up tube 25 and collector plate 28 will cause the exiting ink flow to form a vortex 30 concentric with and extending up into the pick-up tube. The low pressure within the vortex serves to attract dislodged particles and deposits them on top of the collector plate 28. As ink continues to rise within the pick-up tube, it encounters the plate filter element 21, consisting of a 8"-24" stack of approximately 500 metal plates 2.25"-7.6" in diameter spaced 0.0035" apart. A high torque motor 22 rotates the stack of plates through a stationary stack of intermeshing cleaner plates 23 at a rate of about 30 rpm. As the ink flows into the stack's hollow interior, particles larger than the 0.0035" spacing are trapped and subsequently combed free as the stack rotates through stationary stack of cleaner blades. The combed-free particulate drops down into the center of the vortex where it is held captive and deposited on the collector plate. Ink passed through the plates continues upward where it exits through the outlet 29. When it is determined that the build-up of particulate on the collector plate and the interior walls of the device is excessive, a purge cycle is initiated in which inlet 24 and outlet 29 are closed, solvent is introduced into the device via inlet 31 and allowed to soak. A high-pressure air purge subsequently clears the device through outlet 32.

Ink is subsequently pumped through the polishing filter 10 in FIG. 1. The polishing filter consists of a 325 mesh (American Standard Sieve) sieve with an area of 176 square inches. Both the filtering device and the polishing filter 10 are subjected to a purge cycle initiated when a pressure drop of 140 p.s.i. is detected across the filtering device, at which time, both the separating device and polishing filter are isolated from the process line, filled with recovered solvent, allowed to soak for a period of time and finally purged with compressed air. The solvent particulate slurry is introduced into a high-pressure hydraulic filter press 12 where solid particulate is collected on a 325 mesh screen. The expelled solvent is returned to the solvent tank and the dried paper dust and lint is disposed of as solid waste without further treatment.

Ink issuing from the polishing filter is transferred to a 110 or larger gallon holding tank 11 which completed the process. This reclaimed ink can then be reused in an offset printing process without further treatment.

EXAMPLE

Approximately 300 gallons of waste ink were obtained from an offset printing operation. Contamination levels were measured to be 17% water, 3% solvent and 2.26% paper dust and lint. The sample had a viscosity of 10,000 S.S.U. This quantity of waste ink was subjected to the reclamation method of this invention.

Approximately 270 minutes were required to complete the vacuum distillation procedure, while ink was passed through the filtering device and polishing filter at a rate of 4 gallons per minute. The contamination levels of this particulate sample required that the filters be purged with solvents after 300 gallons of waste ink was passed. The soaking time required to adequately clean both the filtering device and the polishing filter was about 1.2 minutes.

Analysis of the reclaimed ink indicated the presence of 7% water, <1% solvent, 0.0089% paper dust and lint and a viscosity of 3,300 S.S.U. Such describes a removal of 99% of the paper dust and lint. Reclaimed ink of such specifications can be reused in an offset printing process without further treatment.

While the present invention has been particularly described in terms of the preferred embodiment thereof, it will be understood that numerous variations are possible within the scope of this invention.

What is claimed is:

1. A method of reclaiming pigment containing waste ink contaminated with water, solvents, and solid impurities comprising:
    providing a recovered ink that has substantially the same pigment content and rheological properties as virgin ink, by,
    heating said waste ink under a partial vacuum to boil off said water and said solvents;
    thereafter passing said waste ink through a filtering device to trap only said solid impurities larger than said pigment.

2. The method of claim 1 wherein said waste ink is heated to a maximum temperature of 180° F. under a partial vacuum sufficient to boil off said water and said solvents.

3. The method of claim 1 wherein the boiled-off solvent is condensed and recovered.

4. A method of reclaiming pigment containing waste ink contaminated with water, solvents and solid impurities comprising:
    heating said waste ink under a partial vacuum to boil off said water and said solvents; and
    passing said waste ink through a filtering device, wherein said filtering device causes a high velocity flow of waste ink to abruptly change flow direction within a confined space just prior to exiting said confined space through a continually self-clearing plate-type filter.

5. The method of claim 4 wherein said ink flow is conducted into a vortex flow situated just below the continually self-clearing plate-type filter.

6. The method of claim 4 wherein said plates are spaced no more than 0.003" apart.

7. In a method for reclaiming waste ink contaminated with water, solvents and solid impurities by boiling off said water and said solvents and subsequently filtering out said solid impurities with a self-cleaning plate-type filter, the improvement comprising:
    boiling off said water and said solvents under a partial vacuum;
    disposing said self-clearing plate-type filter just above a confined cavity into which said waste ink is introduced at high velocity, subjected to a number of abrupt flow direction changes and gathered into a vortex flow directly below said self-clearing plate-type filter through which it exits the confined cavity.

8. The method of claim 7 wherein said water and said solvents are subjected to a partial vacuum sufficient to boil off said water and said solvents at no more than 180° F.

9. The method of claim 7 wherein the boiled off solvent is condensed and recovered.

10. The method of claim 7 wherein the plates of said self-clearing plate-type filter are spaced no more than 0.003" apart.

11. An improved method of reclaiming pigment containing waste ink contaminated with water, solvents and solid impurities, the improvement comprising:
    providing a recovered ink that has substantially the same pigment content and rheological properties as virgin ink, by,
    subjecting the contaminated ink to a vacuum distillation procedure to remove said water and said solvents at a temperature below which the ink is subject to degradation; and
    filtering out only those of said solid impurities larger in size than said pigment and leaving solid impurities of a size comparable to or smaller than the pigment, unfiltered.

12. The improved method of claim 11 wherein the maximum temperature encounter in the vacuum distillation procedure is 180° F.

13. The improved method of claim 11 wherein the filtering step comprises causing said ink to flow in a vortex pattern just prior to proceeding through a continually self-clearing plate-type filter.

* * * * *